United States Patent
Miklosovic et al.

(10) Patent No.: US 11,264,929 B2
(45) Date of Patent: Mar. 1, 2022

(54) SYSTEMS AND METHODS FOR NON-RIGID LOAD VIBRATION CONTROL

(71) Applicant: Rockwell Automation Technologies, Inc., Mayfield Heights, OH (US)

(72) Inventors: Robert J. Miklosovic, Chardon, OH (US); Brian Fast, Kirtland, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 162 days.

(21) Appl. No.: 16/574,606

(22) Filed: Sep. 18, 2019

(65) Prior Publication Data

US 2021/0083611 A1   Mar. 18, 2021

(51) Int. Cl.
*H02P 23/04* (2006.01)

(52) U.S. Cl.
CPC .................. *H02P 23/04* (2013.01)

(58) Field of Classification Search
CPC .............................. H02P 23/04; B62D 5/0472
See application file for complete search history.

(56) References Cited

U.S. PATENT DOCUMENTS

| | | | | |
|---|---|---|---|---|
| 6,107,770 A * | 8/2000 | Jackson | ................... | B64G 1/28 244/165 |
| 6,144,181 A * | 11/2000 | Rehm | ...................... | G05B 5/01 318/609 |
| 7,141,946 B2 * | 11/2006 | Rehm | ................. | H02P 23/0004 318/276 |
| 7,309,943 B2 * | 12/2007 | Henderson | ............... | H02N 2/02 310/323.02 |
| 8,299,733 B2 * | 10/2012 | Sattler | .................. | H02N 2/0095 318/118 |
| 9,998,053 B2 * | 6/2018 | Miklosovic | ............ | G05B 13/02 |
| 2005/0128553 A1 * | 6/2005 | Toyama | ................. | B23K 26/08 359/198.1 |

(Continued)

FOREIGN PATENT DOCUMENTS

| | | | |
|---|---|---|---|
| DE | 102017114789 A1 | 1/2019 | |
| WO | 2018230601 A1 | 12/2018 | |
| WO | WO-2018230601 A * | 12/2018 | ............. B66C 23/42 |

OTHER PUBLICATIONS

Extended European Search Report for U.S. Appl. No. 20/187,291 dated Jan. 19, 2021, 12 pages.

(Continued)

*Primary Examiner* — Thai T Dinh
(74) *Attorney, Agent, or Firm* — Fletcher Yoder, P.C.

(57) ABSTRACT

A system includes a motor configured to be coupled to a non-rigid load and a control system disposed within, or communicatively coupled to, a drive system configured to control an operation of the motor. The control system includes a processor and a memory accessible by the processor. The memory stores instructions that, when executed by the processor, cause the processor to generate a smooth move input profile to control the operation of the motor based on inputs specifying a desired operation of the motor, apply a notch filter having a notch filter frequency to the smooth move input profile to produce a filtered smooth move input profile, and send a command to the drive system based on the filtered smooth move input profile, wherein the command is configured to adjust the operation of the motor.

14 Claims, 6 Drawing Sheets

(56) References Cited

U.S. PATENT DOCUMENTS

2018/0262144 A1* 9/2018 Miklosovic ............ H02P 23/20

OTHER PUBLICATIONS

Ko, R.C. et al., "Reducing Resonances in Profiling Machine Tools by Geneialing Smooth Commands," Proceedings of the 25th Annual Conference of the IEEE Industrial Electronics Society, Nov. 29, 1999, 6 pages.

Neupert J. et al., "Tracking and anti-sway control for boom cranes," Control Engineering Practice, Pergamon Press, vol. 18, No. 1, Jan. 1, 2010, 14 pages.

* cited by examiner

SYSTEMS AND METHODS FOR NON-RIGID LOAD VIBRATION CONTROL

BACKGROUND

The present disclosure relates generally to motor control. More specifically, the present disclosure relates to controlling motors coupled to non-rigid loads.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Motors or other actuators are used in many different applications to move non-rigid loads. These non-rigid loads may include, for example, a mass suspended by a cable (e.g., crane and hoist), a load coupled by a belt or long shaft, a cantilevered load, a tank or other vessel carrying a liquid, an end effector of a robot, or an otherwise flexible object susceptible to vibration, resonance, or other movement in response to movement by the motor. Even tightly controlled motors may cause loads to move in an undesirable fashion. Accordingly, improved techniques for reducing movement of non-rigid loads are needed.

BRIEF DESCRIPTION

In one embodiment, a system includes a motor configured to be coupled to a non-rigid load and a control system communicatively coupled to a drive system configured to control an operation of the motor. The control system includes a processor and a memory accessible by the processor. The memory stores instructions that, when executed by the processor, cause the processor to generate a smooth move input profile to control the operation of the motor based on inputs specifying a desired operation of the motor, apply a notch filter having a notch filter frequency to the smooth move input profile to produce a filtered smooth move input profile, and send a command to the drive system based on the filtered smooth move input profile, wherein the command is configured to adjust the operation of the motor.

In another embodiment, a non-transitory, tangible, computer readable medium includes instructions that, when executed by a processor, causes the processor to receive inputs specifying a desired operation of a motor, wherein the motor is communicatively coupled to a drive system and configured to be coupled to a non-rigid load, generate a smooth move input profile to control the operation of the motor based on the inputs specifying the desired operation of the motor, apply a notch filter having a notch filter frequency to the smooth move input profile to produce a filtered smooth move input profile, and send a command to the drive system based on the filtered smooth move input profile, wherein the command is configured to adjust the operation of the motor.

In yet another embodiment, a method includes steps of generating, via a control system, a smooth move input profile to control actuation of a motor coupled to a non-rigid load based on inputs specifying a desired operation of the motor, applying, via the control system, a notch filter having a notch filter frequency to the smooth move input profile to produce a filtered smooth move input profile, and sending, via the control system, a command to a drive system based on the filtered smooth move input profile, wherein the command is configured to adjust the operation of the motor.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
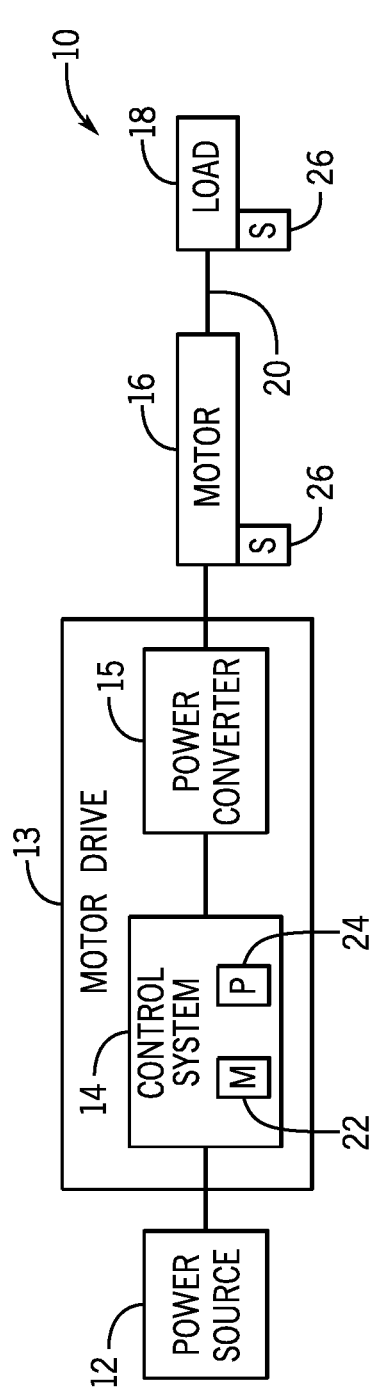
FIG. 1 illustrates a block diagram of a high-level overview of an industrial system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Motors are frequently used to move non-rigid loads. These configurations may include, but are not limited to, a mass suspended by a cable (e.g., crane and hoist), a load coupled to another object by a belt or long shaft, a cantilevered load, a tank or other vessel carrying a volume of liquid, an end effector of a robot, or an otherwise flexible object. Sharp movements by the motor and/or inputs at the resonant frequency of the load may cause the load to sway, slosh, resonate, vibrate, or otherwise move in an undesirable fashion. Even tightly controlled motors may excite the load at the resonant frequency, causing undesirable movement of the load. In response, some operators may de-tune motors to reduce vibration at the resonant frequency. For example, an operator may reduce a gain setting of a proportional-integral (PI) controller to produce a lower bandwidth control signal, controlling the motor at a slower rate, and thus avoiding excitation at the resonant frequency of the system. However, detuning a motor can compromise the motor's performance.

The disclosed techniques include utilize "smooth move" input profiles and a notch filter to control actuation of the motor. Smooth move input profiles, also referred to as command profiles and/or reference profiles, are input profiles having at least second derivatives that are piece-wise continuous. In some embodiments, smooth move input profiles may have third, fourth, fifth, and so on derivatives that are piece-wise continuous. For example, a smooth move input profile may include a cubic function, a 5th order polynomial function, a 7th order polynomial function, a sinusoidal function, a modified sine function, a sine squared function, etc. By implementing smooth move input profiles, the motor may move according to a smooth and steady function. The piece-wise continuity avoids steps that generate harmonics to excite motor and load resonances. The notch filter removes components of the input signal within a specified range of frequencies. The notch filter is defined by a notch frequency, a notch width, a notch depth, and a gain. The notch frequency defines the central frequency that the notch filter removes. The notch width defines the range of frequencies removed by the notch filter, which is centered at the notch frequency. The notch depth defines the amplitude removed within the range of frequencies defined by the notch frequency and the notch width. The gain is a ratio of the output of the filter to the input to the filter. By setting the notch frequency to the resonant frequency of the load, the notch filter removes parts of the input signal that are likely to excite the load at the resonant frequency and cause movement of the load. In some cases, the non-rigid load vibration control system may operate in an open loop configuration with just the smooth move input profile and the notch filter, with no feedback loop from the load. However, in other embodiments, the non-rigid load vibration control system may operate in a closed loop configuration, using a sensor to collect data corresponding to the load during actuation of the motor. In such an embodiment, the control system may generate a supplemental input signal based on the collected data, via an auxiliary feedback loop, and/or with an adjustable integral gain. In some embodiments, the supplemental input signal may be conditioned by a proportional integral (PI) process block.

Using the smooth move input profile and a notch filter in conjunction with one another may reduce sharp movements by the motor, as well as reducing excitation of the load at the resonant frequency. Smooth movements (e.g., movements based on input profiles having at least second derivatives that are piece-wise continuous) by the motor and input profiles having reduced amplitudes at the resonant frequency of the load reduce unwanted an unpredictable movement, vibration, and resonance of the load, resulting in smooth and predictable load behavior during actuation of the motor.

By way of introduction, FIG. 1 is a perspective view of a system 10, including a power source 12, a motor drive system 13, which includes a control system 14 and a power converter 15, a motor 16, and a compliant on non-rigid load 18. In the instant embodiment, the system 10 is an industrial automation system 10 having one or more motor drive systems 13 coupled to one or more motors 16, which are then coupled to one or more compliant loads 18. In such an embodiment, the motor drive includes the control system 14 and the power converter 15. The control system 14, which may be used to control the motor drive systems 13, may include various subcomponents, such as a non-transitory memory 22, a processor 24, a user interface, and the like. The power converter 15 may be configured to condition the power signal output by the control system 14. For example, the power converter 15 may be configured to convert a signal from alternating current (AC) to direct current (DC), convert a signal from DC to AC, step a signal up, step a signal down, etc. The motor drive system 13 may also include various subcomponents, such as a rectifier, an inverter, driver circuitry, one or more switches, etc., that may be used to control the operation of the motor 16. The power source 12 may supply a regular voltage or high voltage alternating current (AC) signal provided by a utility power grid (e.g., a standard electrical outlet), a battery, a capacitor, a generator, or some other source of AC or direct current (DC) electrical power. However, it should be understood that many possible embodiments are envisaged. For example, the control system 14 may be any component configured to output a control signal (directly or indirectly) to the motor 16 or actuator in order to cause the actuator to move. Accordingly, the motor 16 may have mechanical and/or electrical components and may include a linear motor, a servo, a rotational electric motor, a combustion engine, a trolley, a mover, or any other component configured to move in response to a control signal. The load 18 may be any compliant load, meaning that the load itself may be compliant, may be coupled to the motor via a compliant linkage 20, or may otherwise be capable of movement in one or more directions. For example, the load 18 may be a mass suspended by a cable (e.g., crane and hoist), a load coupled by a belt or long shaft, a cantilevered load, a tank carrying a liquid, an end effector of a robot, or otherwise flexible object susceptible to movement in response to movement by the motor 16. In some embodiments, the system 10 may include sensors 26 disposed on the motor (e.g., an encoder), on the load 18, or both. The sensors 26 may be in communication with the control system 14 and providing measurements to the control system 14, which the control system 14 may utilize to generate control signals.

Figure 2:
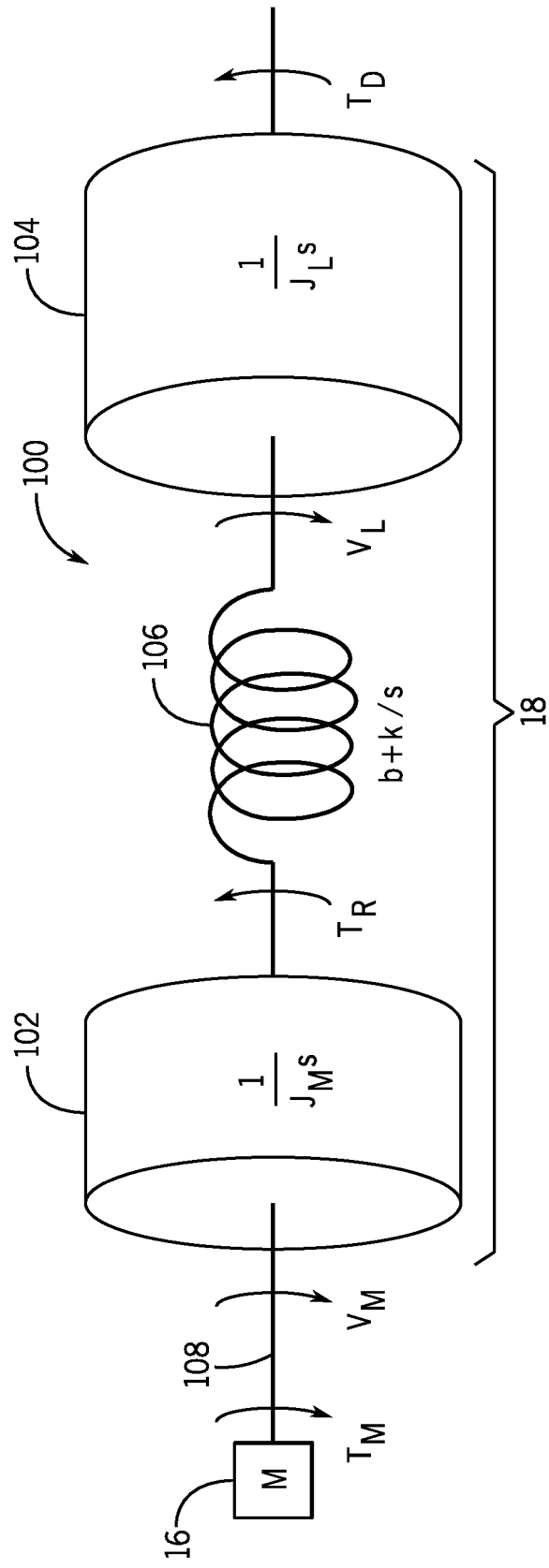
FIG. 2 is a schematic of a compliant two mass system, which can be used to model the system shown in FIG. 1, in accordance with embodiments presented herein.

In some cases, because of the compliant nature of the load 18, controlled movement of the motor 16 may result in swaying, oscillation, vibration, sloshing, or other unwanted movement of the load 18. Accordingly, the system 10 can generally be modeled as a compliant two mass system. FIG. 2 is a schematic of a compliant two mass system 100, which can be used to model the mechanical aspect of the motor 16 and the load 18 within the system 10 shown in FIG. 1 as a rotating machine. However, it should be understood that models for crane and hoist configurations, liquid slosh, robot end effectors, etc. are similar. As shown, the two mass system 100 includes a first mass 102 and a second mass 104, coupled to one another by a spring 106. The motor 16 provides an input via a shaft 108 and the load 18, represented by the first mass 102, the second mass 104, and the spring 106, responds. As shown in FIG. 2, the motor 16 provides a motor torque, $T_M$, and rotates the shaft 108 at a motor velocity, $V_M$. The moment of inertia of the motor 16 is represented by $J_M$ and the angular displacement of the motor 16 is represented by s. $T_R$ represents the reaction torque on the shaft 108 from the first mass 102. The viscous friction is represented by b and k represents the spring constant of the spring 106. The second mass 104 rotates at a load velocity, $V_L$. The moment of inertia of the load 18 is represented by $J_L$. The load torque disturbance is represented by $T_D$. The two mass system 100 model shown in FIG. 2 can be used to determine motor side resonances and load side resonances of the system 10 shown in FIG. 1 in response to movement by the motor 16.

Figure 3:
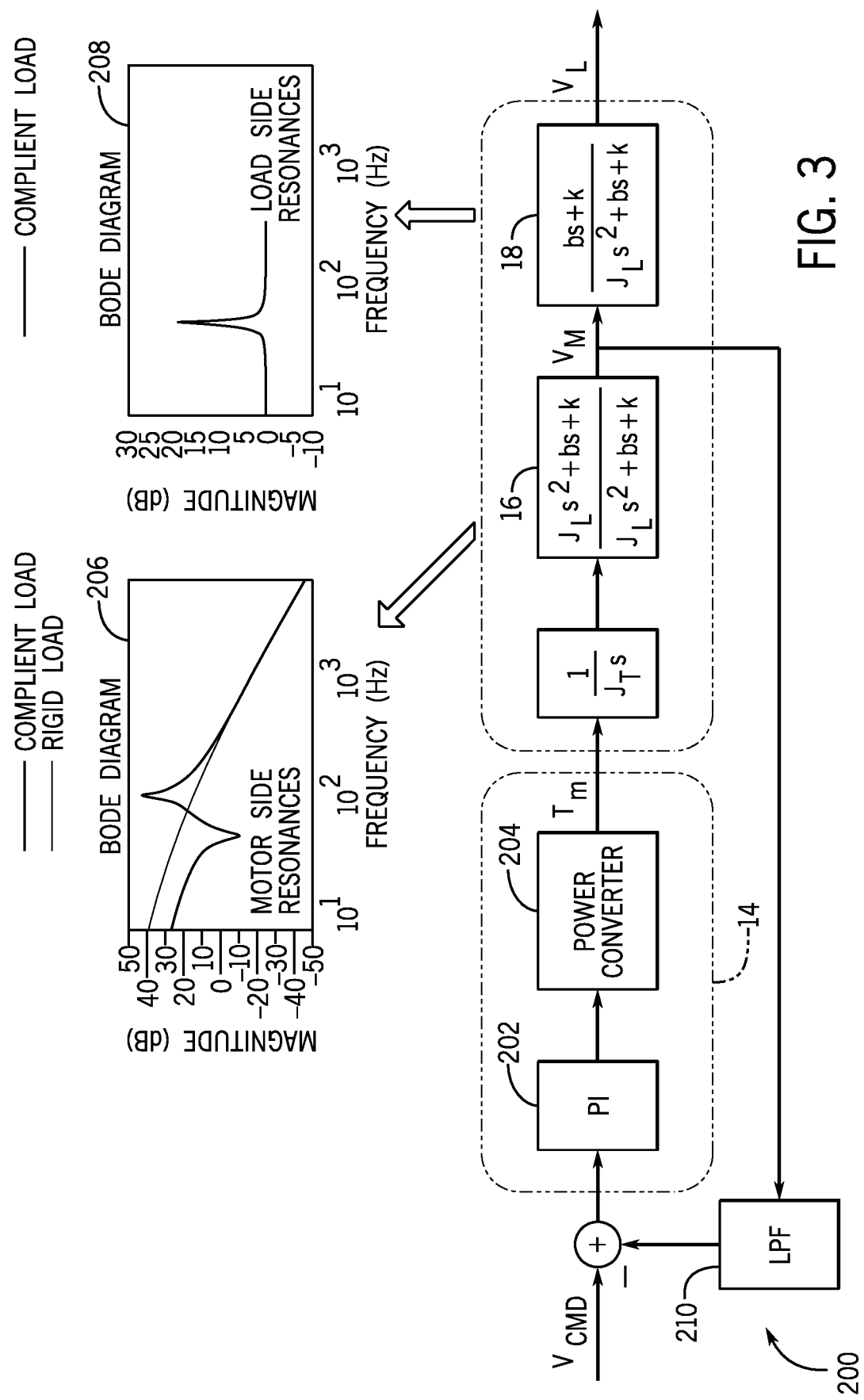
FIG. 3 illustrates a velocity control loop for the system shown in FIG. 1 that utilizes the compliant two mass system shown in FIG. 2 to model motor side resonances and load side resonances in the system shown in FIG. 1, in accordance with embodiments presented herein.

FIG. 3 illustrates a velocity control loop 200 for the system 10 shown in FIG. 1 that utilizes the compliant two mass system 100 shown in FIG. 2 to model motor side resonances and load side resonances in the system 10. As shown, a PI controller 202 outputs a control signal to a power converter 204, which converts and/or conditions the control signal and outputs the modified control signal to the motor 16. The motor side resonances, plotted in the motor side resonances bode diagram 206 may be determined by the transfer function:

$$\text{motor side resonances} = \frac{J_L s^2 + bs + k}{J_E s^2 + bs + k}, \quad (1)$$

wherein, $J_E$ is defined as:

$$J_E = \frac{J_L \cdot J_M}{J_L + J_M}. \quad (2)$$

Similarly, the load side resonances, plotted in the load side resonances bode diagram 208 may be determined by the transfer function:

$$\text{load side resonances} = \frac{bs + k}{J_L s^2 + bs + k}. \quad (3)$$

As illustrated in FIG. 3, the motor velocity, $V_M$, may be measured (e.g., via an encoder) and passed through a low pass filter 210, and fed back to the PI controller along with a command velocity, $V_{CMD}$. As shown in the respective bode diagrams, both the motor 16 and the load 18 resonate at specific frequencies. Accordingly, steps may be taken to reduce the resonance of the system 10. Specifically, the combination of a "smooth move" input profile and a notch filter may be used to reduce the resonances of within the system 10.

Figure 4:
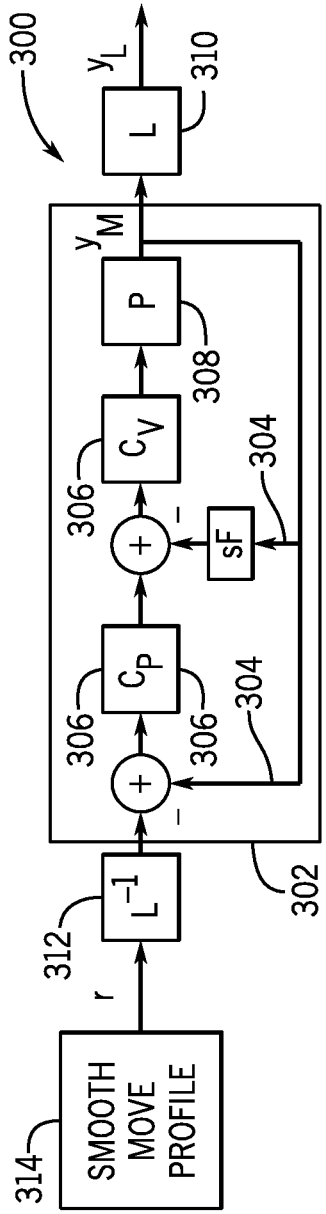
FIG. 4 is a control loop diagram illustrating an open loop approach to reducing resonance in a closed loop system, in accordance with embodiments presented herein.

FIG. 4 is a control loop diagram 300 illustrating an open loop approach to reducing resonance in a closed loop system 302. As shown, the closed loop system 302 may include one or more feedback loops 304 in which one or more measurements taken within the system (e.g., $y_M$) are compared to one or more set points (e.g., r) by one or more control blocks 306 and/or one or more process blocks 308. As shown, the closed loop control system 302 may cause the load to resonate at some resonant frequency L 310, which can be measured or otherwise determined. To reduce resonance at the resonant frequency, a notch filter 312 may be applied to the input signal before providing the input signal to the closed loop system 302. Historically, notch filters have been disfavored in conditioning input command signals for load control applications. Instead, technologies such as input shaping have generally been preferred over notch filters in the industry for addressing load resonance. As is described in more detail below, one or more parameters of the notch filter (e.g. the frequency of the notch filter, the width of the notch filter, the depth of the notch filter 312, the gain of the notch filter, etc.) may be customizable. Because the notch filter 312 is in application an inverse of resonance, removing a range of frequencies from vibration, the value of the notch filter 312 may be set at an inverse of the load side resonance transfer function (e.g., $L^{-1}$). By removing a range of frequencies around a resonant frequency, L 310, from an input signal, excitation, and thus, resonance at the resonant frequency, L 310, is reduced.

In addition to the notch filter 312, "smooth move" input profiles 314 may be used instead of traditional linear or otherwise discontinuous input profiles. Smooth move profiles 314 may include input profiles for motors that do not include steps, jumps, or other discontinuities in the acceleration of a motor or actuator. Put another way, smooth move profiles 314 are profiles that are piece-wise continuous to the $n^{th}$ derivative of the input profile. For example, the smooth move input profiles 314 may include, for example, a cubic function, a 5th order polynomial function, a 7th order polynomial function, a sinusoidal function, a modified sine function, an adjusted sine function, a sine squared function, a cyclosoidal function, a sine-constant-cosine (SCCA) function, a simple harmonic motion, and so forth. The use of smooth move input profiles 314 may further reduce unwanted vibration, resonance, and/or movement within a system 302.

Figure 5:
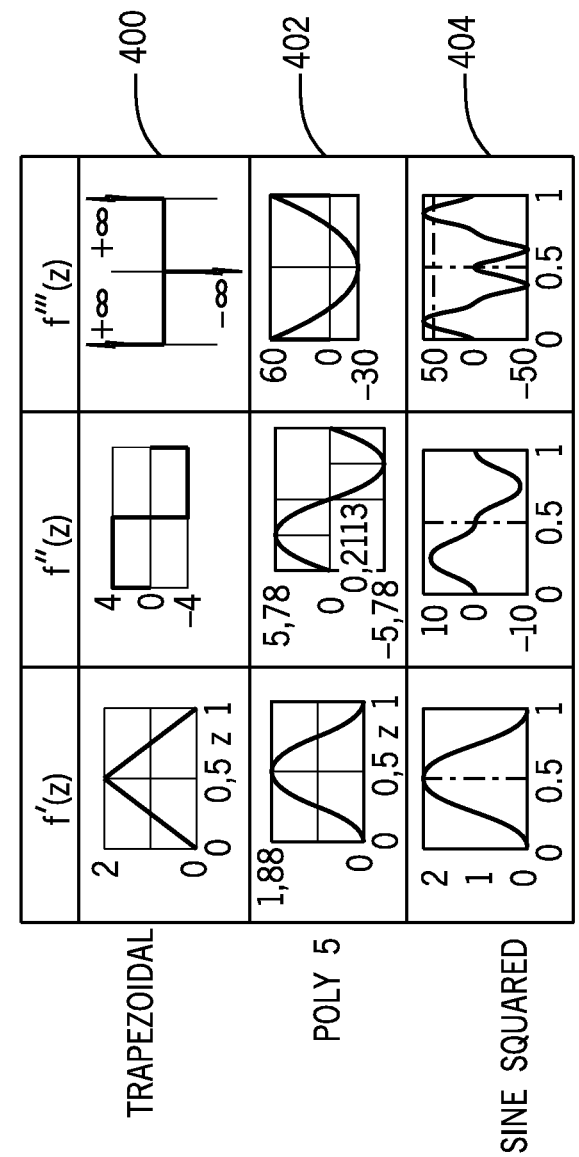
FIG. 5 illustrates first, second, and third derivatives for several different input functions, in accordance with embodiments presented herein.

FIG. 5 illustrates first, second, and third derivatives for several different input functions. The first row 400 includes, from left to right, first, second, and third derivatives of a trapezoidal input function. The first derivative of the trapezoidal input function is representative of velocity of the motor and/or load. As shown in FIG. 5, the first derivative of the trapezoidal input function is piece-wise continuous in the first derivative because the graph of the first derivative does not include any steps or jumps (e.g., instantaneous changes in displacement, velocity, acceleration, etc. at a given moment in time). Steps create harmonics (e.g., the Fourier transform of a square wave) which excite motor and load resonances. However, as shown in FIG. 5, the graphs of the second and third derivatives of the trapezoidal input function do include steps, so the trapezoidal input function is not piece-wise continuous in the second or third derivative. Accordingly, the trapezoidal input function is considered to be "C1 continuous" (i.e., only the first derivative is continuous) and is not considered a smooth move input profile. However, the graphs of the various derivatives of the $5^{th}$ order polynomial input function shown in the second row 402 do not include any steps or jumps, so the $5^{th}$ order polynomial input function is piece-wise continuous in the first, second, and third derivatives. Similarly, the graphs of the various derivatives of the sine squared input function shown in the third row 404 do not include any steps or jumps, so the sine squared input function is piece-wise continuous in the first, second, and third derivatives. Accordingly, the $5^{th}$ order polynomial input function and the sine squared input function would be considered smooth move input functions. It should be understood, however, that these examples are not intended to be limiting and that other input profiles that are piece-wise continuous to a specified derivative may be considered smooth move profiles.

Figure 6:
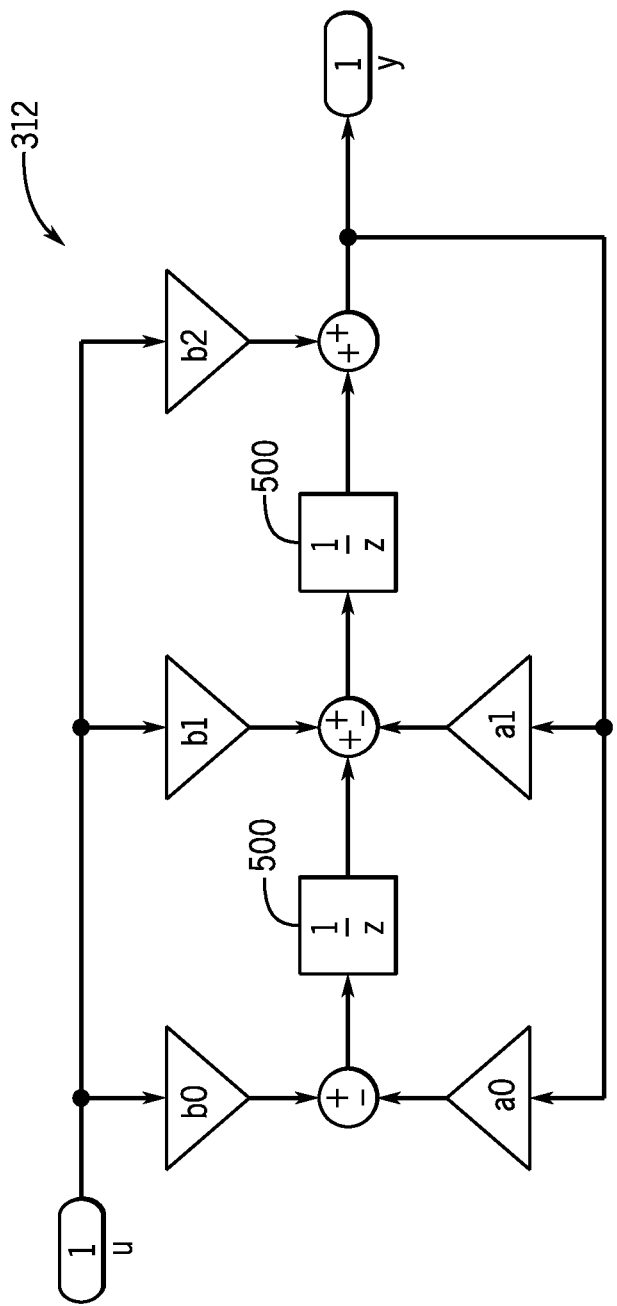
FIG. 6 illustrates a schematic of an embodiment of a discrete second order notch filter, in accordance with embodiments presented herein.

FIG. 6 is a schematic of an embodiment of the notch filter 312, illustrated as a discrete second order notch filter 312. However, it should be understood that that the discrete second order notch filter 312 shown in FIG. 6 is merely an example and that use of other notch filters is also envisaged. As shown, the notch filter 312 includes first and second delay elements 500. The continuous-time transfer function of the notch filter 312 is represented by the following equation:

$$F(s) = \frac{y(s)}{u(s)} = \frac{k^2 s^2 + 4\pi k \zeta_d fs + (2\pi f)^2}{s^2 + 4\pi \zeta_w fs + (2\pi f)^2}, \tag{4}$$

wherein s is the angular displacement, f is the notch frequency in units of Hz, $\zeta_w$ is the notch width, $\zeta_D$ is the notch depth, and k is the gain. In the instant embodiment, the notch filter 312 may be provided to a customer with one or more default settings in order to ease installation for the customer. For example, the default value for notch width may be 0.707, the default value to notch depth may be 0, and the default value for gain may be 1. These default values may be determined to achieve broad applicability in the widest range of applications. Accordingly, the customer may only have to set the notch frequency in order to start using the notch filter 312. However, the customer may stray from the default settings in order to fine tune the notch filter 312 to the specific application being implemented.

Returning to the control loop diagram 300 of FIG. 4, it should be understood that the closed loop system 302 shown is merely an example and a place holder for any open or closed loop system to which the disclosed techniques may be applied. That is, the notch filter 312 and smooth move input profiles 314 may be applied to many other control systems. Further, the control loop diagram 300 shown in FIG. 4 represents an open-loop approach because there is no feedback loop based on a measurement taken at the load. For most customers, the open loop approach shown in FIG. 4 will perform adequately such that the simplicity of an open loop approach outweighs the improved performance, but added complexity, of a closed loop approach. However, in some embodiments, an outside disturbance (e.g., wind or picking a load up off center, creating non-zero initial conditions) may make an application better suited to the improved performance of a closed loop approach, despite the added complexity.

Figure 7:
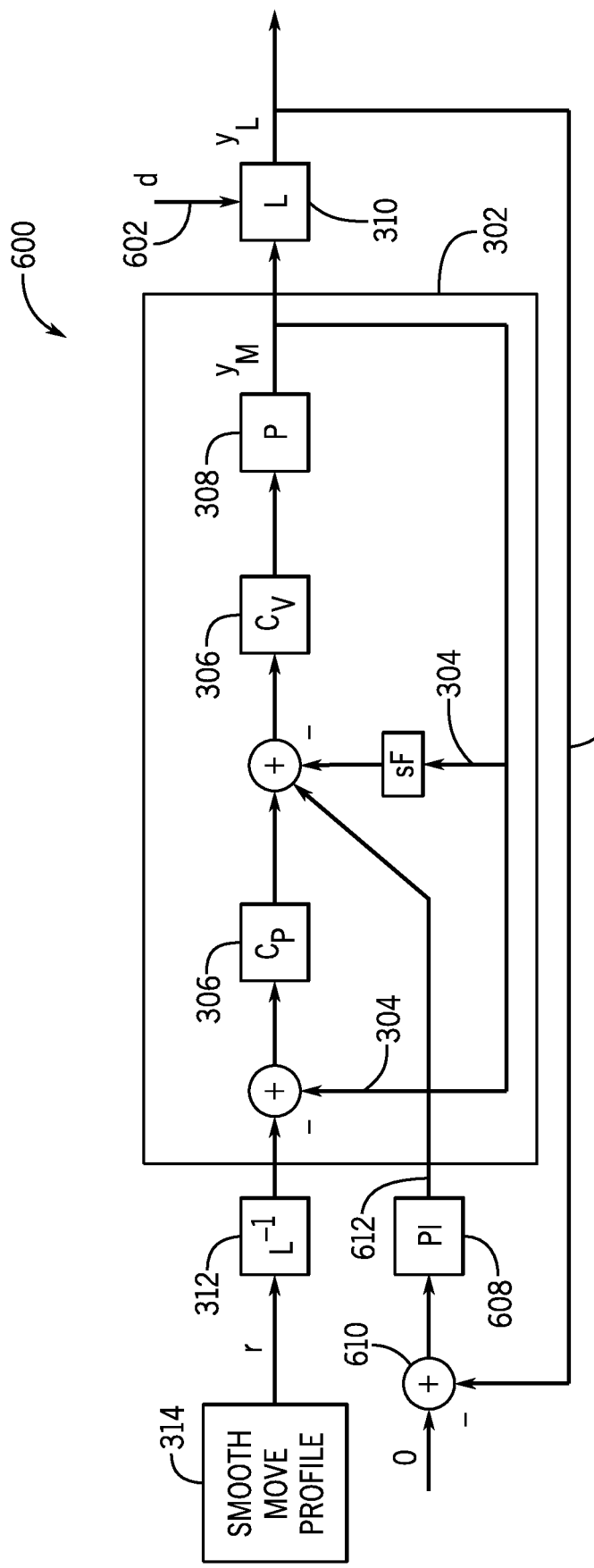
FIG. 7 is a control loop diagram illustrating a closed loop approach to reducing resonance in the closed loop system shown in FIG. 4, in accordance with embodiments presented herein.

FIG. 7 is a control loop diagram 600 illustrating a closed loop approach to reducing resonance in a closed loop system 302. As shown, a disturbance 602 (e.g., wind or some other outside force, illustrated as $T_D$ in FIG. 2 for rotating loads) may be applied to the load, resulting in unwanted vibration, resonance, or movement of the load. Accordingly, the control loop diagram 600 includes a feedback loop 604 (e.g., based on a measurement on or near the load from a sensor). The feedback loop may run through a proportional integral (PI) process block 608 before being input to the closed loop system 302 as a supplemental input signal 612. In some embodiments, the system may also include a single input (e.g., knob) integral gain 610, which may be adjusted by a user. Accordingly, the system may utilize measurements take from on or around the load to adjust the inputs to the closed loop system 302 in order to account for the disturbance 602 and reduce any unwanted vibration, resonance, or movement.

Figure 8:
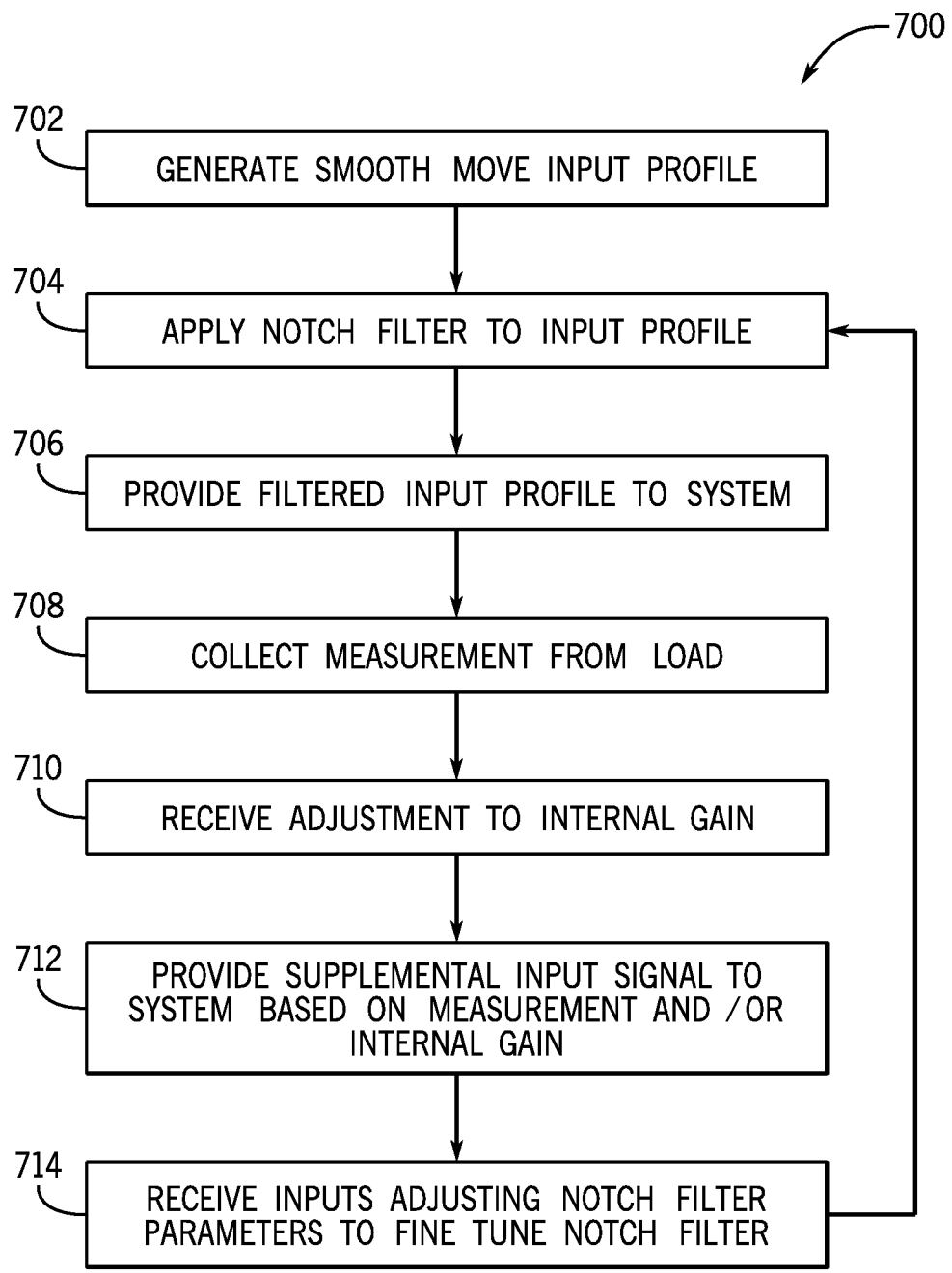
FIG. 8 is a flow chart of a process for reducing resonance of a non-rigid load, in accordance with embodiments presented herein.

FIG. 8 is a flow chart of a process 700 for reducing resonance of a non-rigid load 18. At block 702, a smooth move input profile 314 is generated based on the desired movement of the motor 16. As previously described, smooth move profiles 314 are profiles that are piece-wise continuous to the $n^{th}$ derivative of the input profile. For example, if the value of n is set to 2, a smooth move profile 314 is an input profile that does not include steps, jumps, or other discontinuities in the acceleration (i.e., second derivative of position) of the motor 16 or actuator. Smooth move profiles 314 may include, for example, cubic, $5^{th}$ order polynomial, $7^{th}$ order polynomial, sinusoidal, modified sine, adjusted sine, sine squared, cyclosoidal, sine-constant-cosine (SCCA) functions, simple harmonic motion, etc.

At block 704, a notch filter 312 is applied to the generated smooth move profile 314. The notch filter 312 removes a range of frequencies from the smooth move profile 314. The notch filter 312 may be defined by multiple parameters, which may include, for example, notch frequency, notch width, notch depth, and gain. The notch frequency defines the central frequency that the notch filter 312 removes. The notch width defines the range of frequencies removed by the notch filter 312, which is centered at the notch frequency. The notch depth defines the amplitude removed within the range of frequencies defined by the notch frequency and the notch width. The gain is ratio of the output of the filter to the input to the notch filter 312. Though each of the parameters may be capable of adjustment by a user, the notch filter 312 may be provided with default values for some of the parameters in order to ease installation and setup. For example, the default value for notch width may be 0.707, the default value to notch depth may be 0, and the default value for gain may be 1.

At block 706, the filtered input profile 314 is provided to the system 302. In some embodiments, the filtered input profile 314 is provided to a control system 13 of the system, which may further condition the signal before providing the signal to the motor 16. In other embodiments, however, the filtered input profile 314 may be provided directly to the motor 16. The motor 16 may then extend, contract, rotate, or otherwise actuate based on the filtered input profile 314.

At block 708, if a closed loop, non-rigid load vibration control configuration is being implemented, a sensor 26 may collect data from the load 18. For example, the sensor 26 may collect data regarding position, velocity, acceleration, vibration, oscillation, etc. of the load, a shaft, a part of the motor, etc. However, if an open loop load vibration control configuration is being implemented, measurements may not be collected from the load 18 and block 708 may be omitted.

At block 710, an adjustment to an integral gain 610 may be received from a user via a user interface component. As discussed with regard to FIG. 7, some embodiments of the non-rigid load vibration control system may include an integral gain 610, while other embodiments of the non-rigid load vibration control system may omit an integral gain 610. For example, closed loop embodiments of the non-rigid load vibration control system may include an integral gain 610 and open loop embodiments of the non-rigid load vibration control system may omit an integral gain 610. Accordingly, if the non-rigid load vibration control system does not have an integral gain control 610, block 710 may be omitted. For embodiments of the non-rigid load vibration control system that include an integral gain 610, the integral gain may be a single user interface element (e.g., a rotating knob, slider, etc.) that allows the user to control the gain.

At block 712, a supplemental input signal 612 is provided to the system 302 based on the measurement collected in block 708 and/or the gain adjustment received in block 710. As shown and described with regard to FIG. 7, in some embodiments, the feedback signal 604 may be run through a process block 608 (e.g., a PI process block) before being provided to the system 302 as the supplemental input signal 612. In some embodiments, the supplemental input signal 612 may be provided along with the filtered input profile signal 314 at the same point in the system 302. In other embodiments, as shown in FIG. 7, the supplemental input signal 612 may be provided to a different point within the system 302 than the filtered input profile signal 314. The system 302 may then continue to run based on the supplemental input signal 612 and the filtered input profile signal 314.

At block 714, inputs adjusting one or more of the notch filter parameters may be received to fine tune the notch filter 312. As previously described, the notch filter parameters may include notch frequency, notch width, notch depth, and gain. The notch filter 312 may be shipped with various default settings to one or more of the parameters. However, if the user wishes to fine tune the notch filter 312 by making adjustments to the existing parameters, the user may provide inputs making adjustments to one or more of the notch filter parameters. The system may then return to block 704 and implement the adjustments to the notch filter parameters and continue operating with the adjusted notch filter parameters.

The disclosed techniques include utilizing "smooth move" input profiles and a notch filter to control actuation of a motor coupled to a non-rigid load. Smooth move input profiles are input profiles having at least second derivatives that are piece-wise continuous. For example, a smooth move input profile may include a cubic function, a 5th order polynomial function, a 7th order polynomial function, a sinusoidal function, a modified sine function, a sine squared function, etc. Smooth move input profiles result is smooth, steady movement of the motor. The notch filter removes components of the input signal within a range of frequencies. The notch filter is defined by a notch frequency, a notch width, a notch depth, and a gain. The notch frequency defines the central frequency that the notch filter removes. The notch width defines the range of frequencies removed by the notch filter, which is centered at the notch frequency. The notch depth defines the amplitude removed within the range of frequencies defined by the notch frequency and the notch width. The gain is a ratio of the voltage output by the filter to the voltage input to the filter. By setting the notch frequency to the resonant frequency of the load, the notch filter removes parts of the input signal that are likely to excite the load at the resonant frequency and cause movement of the load. In some cases, the non-rigid load vibration control system may operate in an open loop configuration with just the smooth move input profile and the notch filter, with no feedback loop from the load. However, in other embodiments, the non-rigid load vibration control system may operate in a closed loop configuration, using a sensor to collect data corresponding to the load during actuation of the motor. In such an embodiment, the control system may generate a supplemental input signal based on the collected data, via a feedback loop, and/or an adjustable integral gain input. In some embodiments, the supplemental input signal may be conditioned by a proportional integral (PI) process block.

Using the smooth move input profile and a notch filter in conjunction with one another may reduce sharp movements by the motor, as well as reducing excitation of the load at the resonant frequency. Smooth movements by the motor and input profiles having reduced amplitudes at the resonant frequency of the load reduce unwanted an unpredictable movement, vibration, and resonance of the load, resulting in smooth and predictable load behavior during actuation of the motor.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
   a motor configured to be coupled to a non-rigid load via a compliant linkage;
   a control system disposed within, or communicatively coupled to, a drive system configured to control an operation of the motor, the control system comprising:
   a processor; and
   a memory accessible by the processor, the memory storing instructions that, when executed by the processor, cause the processor to:
   generate a smooth move input profile to control the operation of the motor based on inputs specifying a desired operation of the motor, wherein a second derivative of the smooth move input profile is piece-wise continuous;
   apply a notch filter to the smooth move input profile to produce a filtered smooth move input profile, wherein the notch filter has a notch filter frequency that is determined based on a resonant frequency of the non-rigid load; and
   send a command to the drive system based on the filtered smooth move input profile, wherein the command is configured to adjust the operation of the motor.

2. The system of claim 1, comprising a sensor configured to collect data corresponding to the non-rigid load during the operation of the motor, wherein the control system is configured to generate a supplemental input signal to adjust the operation of the motor based on the collected data.

3. The system of claim 2, wherein supplemental input signal is conditioned by a proportional integral (PI) process block.

4. The system of claim 3, wherein the control system comprises a user interface element configured to control an adjustable integral gain of the supplemental input signal.

5. The system of claim 1, wherein the smooth move input profile comprises a cubic function, a 5th order polynomial function, a 7th order polynomial function, a sinusoidal function, a modified sine function, a sine squared function, or a combination thereof.

6. The system of claim 1, wherein the notch filter is defined by a notch width, a notch depth, and a gain.

7. A non-transitory, tangible, computer readable medium comprising instructions that, when executed by a processor, causes the processor to:
   receive inputs specifying a desired operation of a motor, wherein the motor is communicatively coupled to a drive system and configured to be coupled to a non-rigid load, wherein the non-rigid load comprises a mass suspended by a cable, a vessel carrying fluid, or a combination thereof;
   generate a smooth move input profile to control the operation of the motor based on the inputs specifying the desired operation of the motor, wherein a second derivative of the smooth move input profile is piece-wise continuous;
   apply a notch filter to the smooth move input profile to produce a filtered smooth move input profile, wherein the notch filter has a notch filter frequency that is determined based on a resonant frequency of the non-rigid load; and
   send a command to the drive system based on the filtered smooth move input profile, wherein the command is configured to adjust the operation of the motor.

8. The computer readable medium of claim 7, wherein the processor is configured to be communicatively coupled to a sensor configured to collect data corresponding to the non-rigid load during actuation of the motor, wherein the processor is configured to generate a supplemental input signal to adjust the operation of the motor based on the collected data.

9. The computer readable medium of claim 8, wherein supplemental input signal is conditioned by a proportional integral (PI) process block.

10. The computer readable medium of claim 7, wherein the smooth move input profile comprises a cubic function, a 5th order polynomial function, a 7th order polynomial function, a sinusoidal function, a modified sine function, a sine squared function, or a combination thereof.

11. The computer readable medium of claim 7, wherein the notch filter is defined by an adjustable notch width, an adjustable notch depth, and an adjustable gain.

12. A method, comprising:
generating, via a control system, a smooth move input profile to control actuation of a motor coupled to a non-rigid load via a compliant linkage based on inputs specifying a desired operation of the motor, wherein a second derivative of the smooth move input profile is piece-wise continuous;
applying, via the control system, a notch filter to the smooth move input profile to produce a filtered smooth move input profile, wherein the notch filter has a notch filter frequency that is determined based on a resonant frequency of the non-rigid load; and
sending, via the control system, a command to a drive system based on the filtered smooth move input profile, wherein the command is configured to adjust the operation of the motor.

13. The method of claim 12, comprising:
collecting, via a sensor, data corresponding to the non-rigid load during actuation of the motor;
generating, via the control system, a supplemental input signal to adjust the operation of the motor based on the collected data; and
sending, via the control system, the supplemental input signal to the drive system.

14. The method of claim 12, wherein the notch filter is defined by an adjustable notch width, an adjustable notch depth, and an adjustable gain.

* * * * *